United States Patent [19]

Seifert

[11] 4,103,824
[45] Aug. 1, 1978

[54] THERMOSTAT FOR COOLANT PRESENTED AS SWITCH SPECIFICALLY FOR COMBUSTION ENGINES

[76] Inventor: Gerd W. Seifert, P.O. Box Seeberg 29, D-8919 Schondorf, Fed. Rep. of Germany

[21] Appl. No.: 491,818

[22] Filed: Jul. 25, 1974

[51] Int. Cl.² ............................................. F01P 7/02
[52] U.S. Cl. .............................. 236/34.5; 236/101 E; 236/48 R
[58] Field of Search .............. 236/34, 34.5, 101, 48 R; 165/35

[56] References Cited

U.S. PATENT DOCUMENTS

| 1,403,493 | 1/1922 | Furber | 236/34 .5 UX |
| 1,564,504 | 12/1925 | Woolson | 236/34 |
| 1,763,802 | 6/1930 | Levy | 236/34.5 |
| 2,054,997 | 9/1936 | Vang | 236/101 UX |
| 3,069,125 | 12/1962 | Hewitt, Jr. | 236/48.R X |
| 3,450,342 | 6/1969 | Arledge, Jr. | 236/101 X |

*Primary Examiner*—William E. Wayner
*Attorney, Agent, or Firm*—Gust, Irish, Jeffers & Rickert

[57] ABSTRACT

This invention relates to the thermostat for coolants to switch coolant flow from a first passage to either a second or third passage. The thermostat comprises a bimetallic spring disc which in one position directs the flow to the second passage and when heated to a predetermined temperature by the coolant switches the flow to the third passage. The thermostat is adjustably mounted.

17 Claims, 5 Drawing Figures

THERMOSTAT FOR COOLANT PRESENTED AS SWITCH SPECIFICALLY FOR COMBUSTION ENGINES

BACKGROUND OF THE INVENTION

1. Field of the Invention

This invention is in the field of thermostatic controls for coolants and more particularly for a thermostatic switch used in the coolant system of an internal combustion engine.

2. Brief Description of the Prior Art

Thermostatic switches for coolant systems are well known. In conventional systems for use in internal combustion engines the coolant is pumped through the engine and then through a cooler or radiator and then back through the engine. A thermostatic switch is placed in the path of the coolant flow to bypass the radiator during those periods when the coolant is below a predetermined temperature. Upon the coolant reaching the predetermined temperature, the thermostatic switch will switch the flow through the radiator and upon the coolant falling below the predetermined temperature, the switch will again bypass the radiator. In conventional systems, the thermostatic control must be carefully aligned with a valve plate to actuate the valve plate at the predetermined temperatures. Typically, the valve plate is pivoted in the coolant passage and when in the open position remains in the coolant flow path causing a considerable drag on the coolant flow, thus making necessary a relatively large passage diameter.

SUMMARY OF THE INVENTION

In this invention, a thermostatic switch has been provided wherein the valve plate and thermostatic control are the same element and in the preferred embodiment takes the form of a bimetallic spring disc (Spencer disc). The bimetallic disc is positioned so that one side is in contact with the coolant flow in one switch position and the other side is in contact with the coolant flow in the other switch position whereby the switch action will be controlled by the heat absorbed from the coolant. Thus the thermostatic element is of a relatively large size and of excellent heat conductivity and hence reacts more quickly and reliably to the predetermined temperature change of the coolant. The switching hysterisis is small. Only one moving part is involved and the forces experienced are small so that the switch casing may be of a lightweight construction and of relatively simple inexpensive design. The casing may be made of a nonmetallic casing.

In a preferred embodiment, the casing is comprised of an upper and lower section, each section having a circular valve seat between which the bimetallic valve plate is mounted. The valve seats are located oppositely to each other and the distance between them is slightly smaller than the stroke of the bimetallic Spencer valve plate thus resulting in sufficient pressure between the valve and the seats to cause a seal therebetween.

The valve opening is determined by the stroke and diameter of the valve plate. The lower flow resistance coefficient is an additional advantage of this invention.

The bimetallic valve plate is fixed at its center and the center mounting may be adjustable in order to vary the pressure between the valve plate and its respective valve seats. The side of the bimetallic valve plate towards the radiator may be coated with a heat insulating material so that the heat absorbed from the coolant flow will be retained by the disc resulting in faster switching action. This results in a more sensitive, reliable and more accurate thermostat performance.

Valve seats may be mounted in the casing sections, may be multilayered, or the resilient seating material may be placed on the peripheral circumference of the bimetallic valve so as to provide on either surface thereof a seating material which will provide a seal against either casing section, making valve seats on the casing unnecessary.

In order to equalize the pneumatic pressure on either side of the bimetallic valve or to deaerate the cooling systems, the center mounting for the valve may have a bleed channel therethrough which terminates at its upper end with a ball check valve, wherein the ball has a lower specific gravity than the coolant so that after the air has been removed from the engine passage, the coolant flow through the bleed channel will cause the ball to flow against its seat and prevent coolant flow through the valve. By so removing the air from the coolant passage beneath the valve, a more efficient coolant volume is achieved.

The upper and lower casings may be made from plastic or synthetic materials or may have reinforcement with metal or other structurally strong materials in the manners known to the art. For example, the reinforcing materials may be inserted in an injection molding process.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF PREFERRED EMBODIMENTS

Figure 1:
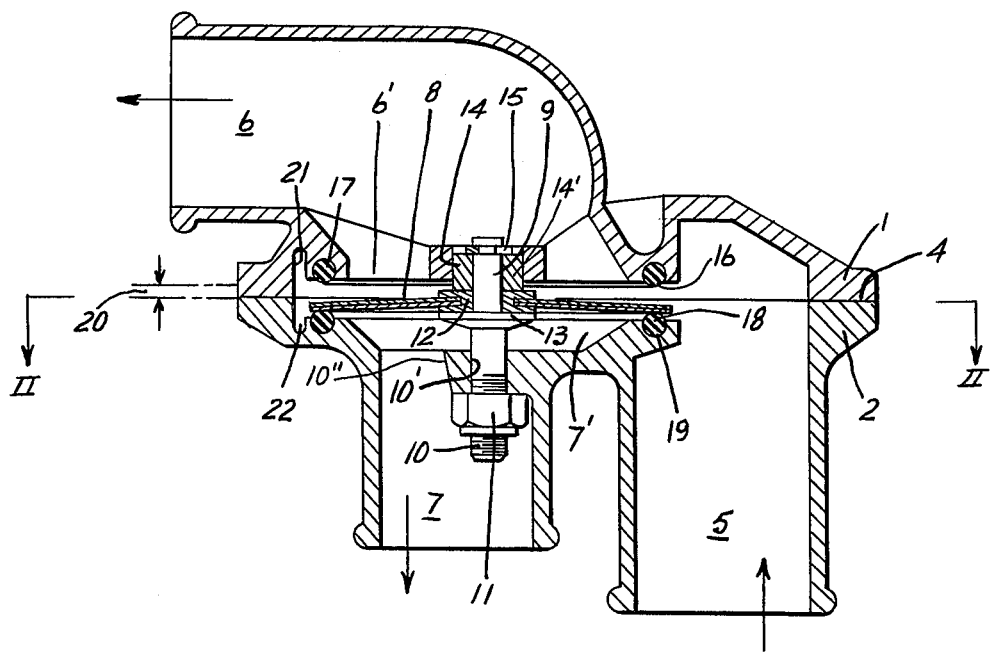
FIG. 1 is a section along a vertical plane through a preferred embodiment of the invention.
Figure 2:
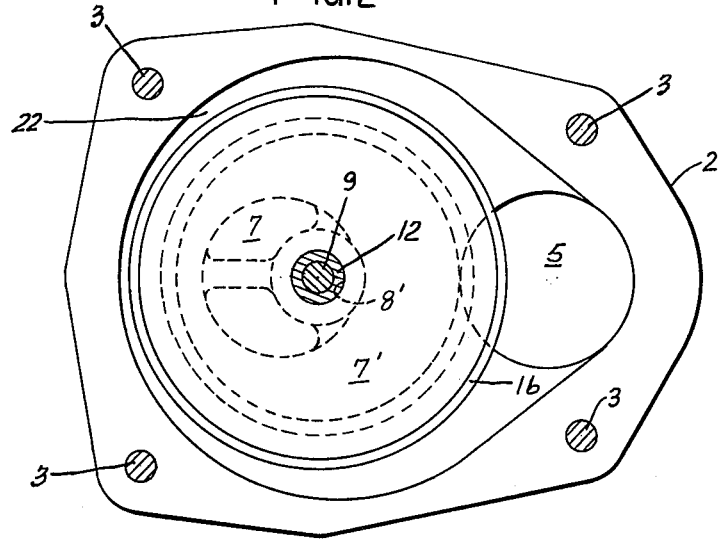
FIG. 2 is a section taken at II—II of the embodiment of FIG. 1.

Referring to FIGS. 1 and 2, the valve casing has upper section 1 and lower section 2 which are assembled and held together by bolts 3. A gasket 4 may be placed between sections 1 and 2 prior to assembly. Coolant flow from an internal combustion engine, (not shown), is pumped through duct 5. Duct 6 is connected to the engine cooler or radiator, not shown, while duct 7 carries coolant directly back to the engine coolant passage, bypassing the radiator.

Formed in section 1 is a hub 14' which is supported within chamber 6'. A circumferential groove carries resilient sealing ring 17 and an arcuate passage 21 is formed radially outwardly of chamber 6'.

In the lower section 2, a threaded hole 10' is formed in projection 10" from the wall of duct 7 and is between a chamber 7' and duct 7. An arcuate groove 22 is formed radially outwardly from chamber 7', and is in registry with groove 21. A preferably circular bimetallic valve plate 8 having a central bore 8' is supported on bolt 9 which is threaded at 10 and is threadedly engaged with the threads 10'. Bolt 9 is thus axially adjustable in section 2. The bolt 9 carries a flange 13 which bears against a gasket ring 12 which is fitted in central bore 8' of disc 8. An adapter 14 is placed over bolt 9 and held in relation thereto by snap ring 15 which is fitted in a groove at the top of bolt 9. Adapter 14 is disposed within hub 14'. A lock nut 11 is threadedly engaged with threads 10 to hold the axial position of bolt 9 relative section 2.

Sections 1 and 2 contain valve seats 16 and 18 on gasket rings 17 and 19 for valve plate 8 and the stroke distance 20 between seat levels 16 and 18 is smaller than the switch stroke of plate 8. Gasket rings 17 and 19 are inserted into grooves of sections 1 and 2, respectively. Duct 6 to the radiator will be closed when the plate 8 is engaged with ring 17. However, when the coolant temperature exceeds the switching level of the bimetallic plate 8, the plate switches and engages seat 18 of ring 19 closing chamber 7' and short circuiting duct 7.

The stroke distance 20 between valve seats 16 and 18 designates the cross-sectional area for the coolant flow, with this area being constant for both switch positions of plate 8.

FIG. 2 is a section taken at II—II of FIG. 1 and shows casing section 2. Arcuate groove 22 is connected to input duct 5 (as is groove 21 in FIG. 1). Groove 22 is designed for continuous and equal flow circumferentially to valve plate 8 regardless of plate position. The axial height of input grooves 21 and 22, which are slightly eccentric to the seats 16 and 18, tapers off gradually in the direction of duct 5 on both sides of the groove peripheries.

Figure 3:
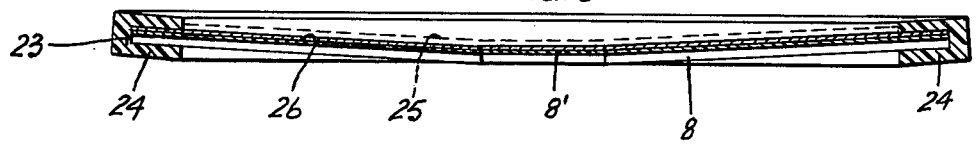
FIG. 3 is a sectional view of a bimetallic valve plate of this invention having a peripheral cover of gasket material.

In FIG. 3 the bimetallic disc 8 has a peripheral edge 23 which is surrounded by gasketing material 24. With the design according to this invention, the force supplied by valve plate 8 against valve seats 16 and 18 is relatively small, and therefore it is possible to construct the seats 16 and 18 in the sections 1 and 2 respectively from a heat "damming" or insulative synthetic material.

One side of the valve plate 8 may be covered by a heat insulative spray, shown by dashed line 25, with this side facing toward the radiator duct 6 (FIG. 1). Thus the heat potential of the coolant liquid will be transformed more efficiently into operating the plate 8, i.e., will heat the plate 8 more quickly and reliably to a switching temperature point.

Figure 4:
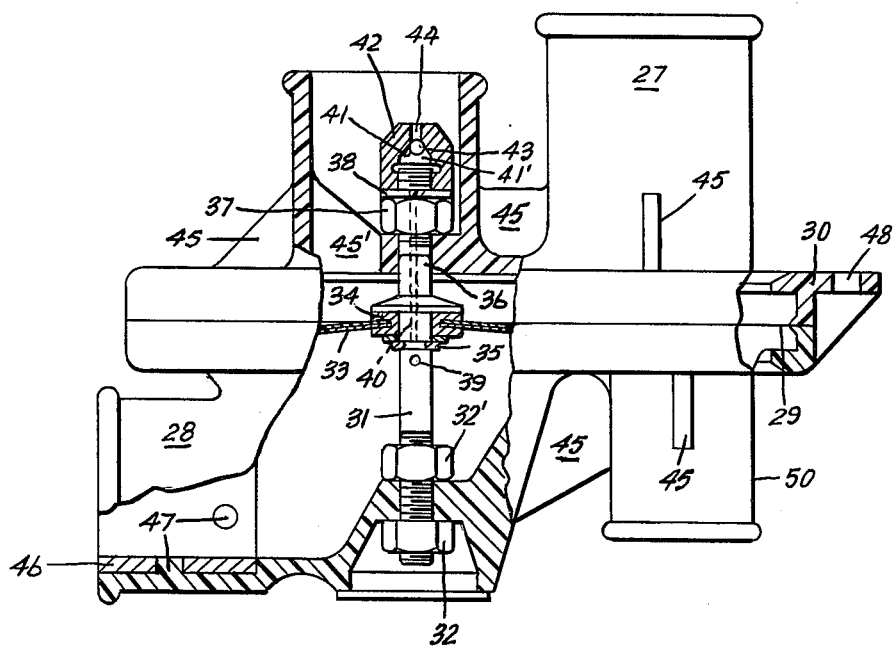
FIG. 4 is a side view, partially sectioned, of a second embodiment of this invention.

FIG. 4 presents a partially cross-sectioned thermostat according to this invention comprising two housing parts 27 and 28 made from plastic material and incorporating a tensile bolt 31 therebetween. Parts 27 and 28 are joined at 29 as by welding or glueing. Additionally, a properly U-shaped clamp made from a suitable material may be applied circumferentially. Within the combined housings 27 and 28, bolt 31 is anchored by nuts 32 and 32', threadedly engaged therewith and on either side of a housing 28 portion, and carrying the bimetallic valve plate 33, its sealing washer 34, and snap ring 35. Bolt 31 is attached to housing part 27 at 36 by adjustable spanner nuts to provide the housing parts 27 and 28 to have the housing at the desired stress in a safe position blocked by washer 38.

Bolt 31 is formed with an axial hole 40 and a radial passage 39. A pressure balancing valve 42 is screwed to bolt 31 to provide the following operation: hole 40 ejects into valve chamber 41' with valve ball 43 seating against conical seat 41 which communicates with orifice 44. Ball 43 is of a lower specific gravity material than the coolant in use whereby orifice 44 will remain open until the coolant fills chamber 41' sufficiently to cause ball 43 to float against seat 41 thereby covering orifice 44.

The pretension exerted by bolt 31 operates through ribs 45 and 45' to apply a compressive force to faces 29 of housing parts 27 and 28.

A reinforcing sleeve 46 is positioned inside of the incoming pipe of the thermostat by bosses 47. Sleeve 46 provides support for clamping connecting parts such as hoses and the like onto it.

Figure 5:
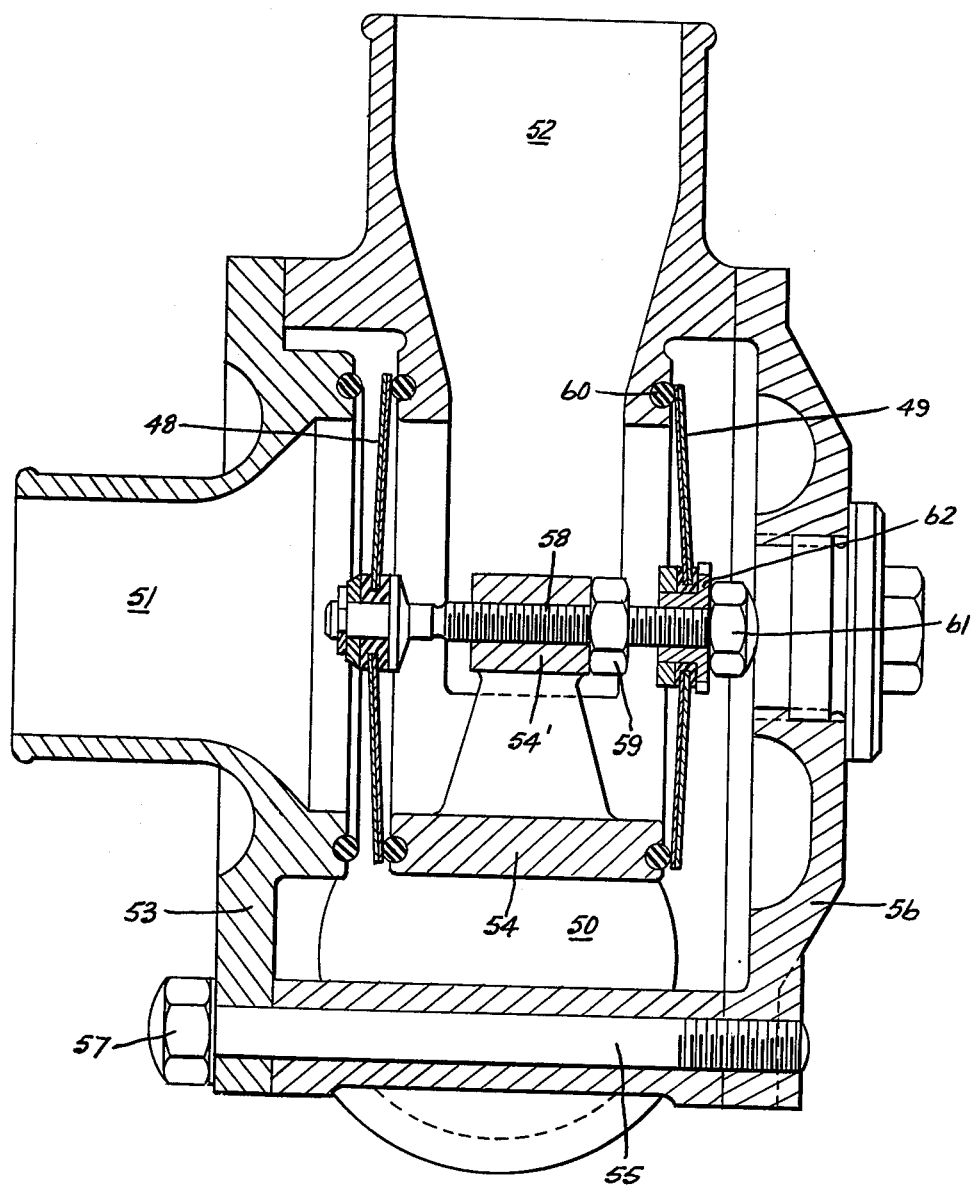
FIG. 5 is a sectional view taken along a vertical plane of a third embodiment of this invention.

FIG. 5 presents a thermostat of this invention having more than one bimetallic valve plate, and in particular plates 48 and 49. Valve plate 48 provides a switching element for governing the connection from incoming chamber 50 to either bypass duct 51 or radiator duct 52. Since the bypass duct 51 may have a smaller diameter, additional bimetallic plate 49 is utilized to provide an auxiliary valve independently from valve 48. After valve plate 49 has reached the specified predetermined switching temperature, it will open and add to the flow capacity. Since plate 49 is not limited in its motion by a valve seat, as its temperature increases, it will bend further in an open direction thus adding to the free flow cross-section.

In this embodiment, housing parts 53, 54 and 56 are bolted together by a plurality of bolts 55 at different circumferentially spaced points, and if necessary, are properly gasketed. Valve plate 48 is fixed to housing part 54 by bolt 58 in an eye 54' which is supported to housing part 54. Bolt 58 in eye 54' is threadedly engaged to adjust the valve plates 48 and 49 and is fixed by lock nut 59. An end 61 of bolt 58 supports auxiliary valve plate 49, through threaded bushing 62. After adjusting bolt 58 to a predetermined position in eye 54' for the main valve plate 48, bolt 58 is fixed by lock nut 59 and then the auxiliary valve 49 is adjusted by turning threaded bushing 62 until valve 49 is properly seated on gasket element 60 which is fixed by lock nut 62.

While there have been described above the principles of this invention in connection with specific apparatus, it is to be clearly understood that this description is made only by way of example and not as a limitation to the scope of the invention.

What is claimed is:

1. Thermostat for engine liquid coolant for changing coolant passage from an input chamber to one of a radiator passage and a bypass passage comprising:
   a temperature sensitive elastic spring valve member;
   a thermal insulating layer on one surface of said valve member;
   said valve member being mounted to spring in one direction at a first predetermined coolant temperature to effect a first open passage between said input chamber and said radiator passage; and
   said valve member being mounted to spring in a second direction below a second predetermined coolant temperature which is less than said first predetermined coolant temperature to effect a second open passage between said input chamber and said bypass passage to thereby bypass said radiator passage.

2. Thermostat according to claim 1 with a two part housing having a first and second section, an annular valve seat being provided in each section, said valve seats being positioned oppositely one another and spaced a predetermined distance from one another, said spacing being less than the spring stroke of said valve member.

3. Thermostat according to claim 2 with a mounting member for mounting said valve member to said housing, said valve member being adjustably mounted at its center to said mounting member.

4. Thermostat according to claim 1 with a valve member mounted in parallel to said temperature sensitive elastic spring valve member.

5. Thermostat according to claim 1 with means for balancing pressures and ventilation between at least two of said passages.

6. Thermostat for engine liquid coolant for changing coolant passage from an input chamber to one of a radiator passage and a bypass passage comprising:
   a temperature sensitive elastic spring valve member;
   said valve member being mounted to spring in one direction at a first predetermined coolant temperature to effect a first open passage between said input chamber and said radiator passage;
   said valve member being mounted to spring in a second direction below a second predetermined coolant temperature which is less than said first predetermined coolant temperature to effect a second open passage between said input chamber and said bypass passage to thereby bypass said radiator passage; and
   a two-part housing having a first and second section, an annular valve seat being provided in each section, said valve seats being positioned oppositely one another and spaced a predetermined distance from one another, said spacing being less than the spring stroke of said valve member, said valve member carrying at its periphery a sealing member which is engageable in sealing relation to said annular valve seats.

7. Thermostat according to claim 6 with said first and second passages being of constant cross-section.

8. Thermostat according to claim 6 with said valve member having a central bore.

9. Thermostat according to claim 6 with said valve member connecting at least two passages in each of its switched positions.

10. Thermostat for engine liquid coolant for changing coolant passage from an output chamber to one of a radiator passage and a bypass passage comprising:
    a temperature sensitive elastic spring valve member;
    said valve member being mounted to spring in one direction at a first predetermined coolant temperature to effect a first open passage between said input chamber and said radiator passage;
    said valve member being mounted to spring in a second direction below a second predetermined coolant temperature which is less than said first predetermined coolant temperature to effect a second open passage between said input chamber and said bypass passage to thereby bypass said radiator passage;
    a two-part housing having a first and second section;
    an annular valve seat provided in each section, said valve seats being positioned oppositely one another and spaced a predetermined distance from one another, said spacing being less than the spring stroke of said valve member; and
    a mounting member mounted at one end to said first section and at its other end to said second section for mounting said valve member to said housing, said valve member being adjustably mounted at its center to said mounting member.

11. Thermostat according to claim 10 with a second temperature sensitive elastic spring valve member mounted between said input passage and said radiator in parallel to said first valve member; an auxiliary valve seat being between said input passage and said radiator passage, said second valve member engageable only with said auxiliary valve seat.

12. Thermostat according to claim 10 with means for balancing pressures and ventilation between at least two of said passages.

13. Thermostat according to claim 12 with valve means being in said mounting member for closing said bore.

14. Thermostat according to claim 13 with valve means comprising a valve body being of lower specific gravity than said coolant.

15. A thermostat for use in a liquid coolant system for an engine for diverting the flow of liquid from one passage to another comprising a housing having three separate chambers wherein one of said chambers is in operative alternative communication with the other two chambers, a first valve seat mounted on said housing and disposed between said one chamber and a second of the other chambers, a second valve seat mounted on said housing and disposed between said one chamber and a third of the other chambers, a thermally operative valve device secured to said housing and being operatively interposed between said two valve seats to selectively prevent in cooperation with one of the valve seats the flow of liquid through one of the chambers, said first and second valve seats being alternatively engageable by said valve device to provide alternative communication between said one chamber and said second and third chambers respectively, the valve device comprising a bimetallic disc secured at its central portion to said housing, said valve seats being disposed on opposite sides respectively of said bimetallic discs to be selectively alternatively engaged thereby, said valve seats being disposed adjacent to two openings in communication with said two chambers respectively which openings in turn are in operative communication with said one chamber, said two openings and corresponding valve seats being spaced apart and juxtaposed, said valve seats lying in substantially parallel planes and said bimetallic disc being disposed therebetween, said bimetallic disc having a thermal insulating layer on one surface thereof.

16. The thermostat of claim 15 wherein said bimetallic disc is mounted in said housing by means of a fastening member secured to the central portion thereof, said fastening member being secured to said housing at a location centrally of said openings and valve seats.

17. A thermostat for engine liquid coolant for changing coolant passage from an input chamber to one of a radiator passage and a bypass passage comprising:
    a temperature sensitive elastic spring valve member in the form of a bimetallic disc;
    said valve member being mounted to spring in one direction at a first predetermined coolant temperature to effect a first open passage between said input chamber and said radiator passage;
    said valve member being mounted to spring in a second direction below a second predetermined coolant temperature which is less than said first predetermined coolant temperature to effect a second open passage between said input chamber and said bypass passage to thereby bypass said radiator passage;
a two-part housing having a first and second section; and
an annular valve seat in each housing section, said valve seats being positioned oppositely one another and spaced a predetermined distance from one another, said spacing being less than the spring stroke of said valve member, said valve member engaging one annular valve seat when sprung in the said one direction and engaging the other annular valve seat when sprung in the said second direction.

* * * * *